US009428277B1

(12) United States Patent
Costello et al.

(10) Patent No.: US 9,428,277 B1
(45) Date of Patent: Aug. 30, 2016

(54) IN CANOPY BLEED AIR ACTUATOR

(71) Applicant: Earthly Dynamics, LLC, Atlanta, GA (US)

(72) Inventors: Mark F Costello, Atlanta, GA (US); Keith Bergeron, Framingham, MA (US); Michael Wayne Shurtliff, Ashland, MA (US); Gregory Michael Noetscher, Shrewsbury, MA (US); Michael Brian Ward, Atlanta, GA (US); Edward James Scheuermann, Atlanta, GA (US)

(73) Assignee: Earthly Dynamics, LLC, Atlanta, GA (US)

( * ) Notice: Subject to any disclaimer, the term of this patent is extended or adjusted under 35 U.S.C. 154(b) by 0 days.

(21) Appl. No.: 14/479,530

(22) Filed: Sep. 8, 2014

(51) Int. Cl.
*B64D 17/34* (2006.01)
*B64D 17/22* (2006.01)
*B64D 17/18* (2006.01)
*B64D 17/02* (2006.01)

(52) U.S. Cl.
CPC .............. *B64D 17/34* (2013.01); *B64D 17/18* (2013.01); *B64D 17/22* (2013.01); *B64D 17/025* (2013.01)

(58) Field of Classification Search
CPC .... B64D 17/025; B64D 17/18; B64D 17/20; B64D 17/22; B64D 17/34; B64D 17/343; B64C 31/036; B64C 2031/065
See application file for complete search history.

(56) References Cited

U.S. PATENT DOCUMENTS

| | | | |
|---|---|---|---|
| 3,104,857 A * | 9/1963 | Knacke et al. | B64D 17/025 244/145 |
| 3,117,753 A | 1/1964 | Ewing | |
| 3,822,844 A | 7/1974 | Sutton | |
| 4,175,722 A | 11/1979 | Higgins | |
| 4,771,970 A * | 9/1988 | Sutton | B64D 17/025 244/145 |
| 5,102,071 A * | 4/1992 | Rieleit | B64D 17/025 244/142 |
| 6,669,146 B2 | 12/2003 | Lee | |
| 8,210,479 B2 | 7/2012 | Fox | |

(Continued)

FOREIGN PATENT DOCUMENTS

| | | |
|---|---|---|
| DE | 4114520 C1 | 10/1992 |
| FR | 2633248 A1 | 12/1989 |
| GB | 2468760 A | 9/2010 |

OTHER PUBLICATIONS

Gavrilovski et al., Parafoil Control Authority with Upper-Surface Canopy Spoilers, J. Aircraft, vol. 49, No. 5, Sep.-Oct. 2012, pp. 1391-1397.

(Continued)

*Primary Examiner* — Tien Dinh
*Assistant Examiner* — Richard R Green
(74) *Attorney, Agent, or Firm* — Moore, Ingram, Johnson & Steele, LLP

(57) ABSTRACT

A system is described to control the flight path of a parafoil. The physical control mechanism is a series of actuators embedded within the parafoil canopy that open a series of holes via slits in the upper surface of the parafoil canopy. Opening and closing the holes changes the forces and moments acting on the parafoil canopy in a consistent manner such that it can be used for flight control. The embedded actuator is attached to a structural cell wall of the parafoil canopy. A control line from the actuator extends through a ring attached to the leading edge of the slit in the upper surface of the parafoil canopy and back down to the lower surface of the parafoil canopy along the opposite side non-structural cell wall.

15 Claims, 3 Drawing Sheets

(56) References Cited

U.S. PATENT DOCUMENTS

| | | | |
|---|---|---|---|
| 8,215,587 B2* | 7/2012 | Mullins | B64D 17/025 244/123.11 |
| 8,489,256 B2 | 7/2013 | Yakimento | |
| 2002/0134890 A1 | 9/2002 | Berzin | |
| 2007/0272801 A1 | 11/2007 | Hilliard | |
| 2011/0315826 A1 | 12/2011 | Brocklebank | |
| 2014/0204801 A1 | 7/2014 | Bordetsky | |

OTHER PUBLICATIONS

Ward et al., Autonomous Control of Parafoils Using Upper Surface Spoilers, AIAA Aerodynamic Decelerator Systems Conference, Mar. 2013, Daytona Beach, Florida.

* cited by examiner

IN CANOPY BLEED AIR ACTUATOR

STATEMENT OF GOVERNMENT INTEREST

The work that lead to this invention was supported in part by the U.S. Army Natick Soldier Research, Development and Engineering Center. Thus, the United States Government may have certain rights to this invention.

FIELD OF THE INVENTION

The present invention relates to an actuator embedded within a parafoil of an aerial delivery system that controls a series of upper surface canopy spoilers.

BACKGROUND OF THE INVENTION

Aerial payload delivery systems, also known as ram canopy parachute systems, offer the capability to deliver large payloads and or people to undeveloped or inaccessible locations. The canopies in these systems are well known and often referred to as parafoils from which payloads may be suspended via control lines. The parafoils are generally constructed of an upper canopy and a lower canopy connected by a cell structure, also known as ribs, that is well known in the art. The flexible parafoils provide aerodynamic lift by virtue of shape of the canopy and an alteration in the shape can greatly affect the directionality of the parafoil.

Several autonomous guided systems have been developed that use trailing edge brake deflection for lateral control by altering the shape of the parafoil that have been shown to increase landing accuracy. The control of internal air vented through the upper surface of the canopy creating aerodynamic spoilers has been shown to improve glide slope control. Such known autonomous systems have involved altering the control lines from a device, such as an actuator, on or within the payload to alter the shape of the parafoil. These known control lines create aerodynamic drag and can become tangled or damaged upon deployment resulting in loss of control and landing accuracy. Known control mechanisms for autonomous parafoils are heavy and expensive with limited performance.

Accordingly, there is a need for an autonomous payload delivery system that is lightweight and small with increased aerodynamic efficiency and glide slope control enabling improvement in landing accuracy.

SUMMARY OF THE INVENTION

The present invention relates to an actuator system to control the flight path of a parafoil used in combination with upper surface canopy spoilers created by slits or incisions in the upper canopy. The physical control mechanism is an actuator embedded within the parafoil that opens a series of spoilers or slits in the upper surface releasing a portion of the ram air inflating the parafoil. The released ram air is known as bleed air. Opening and closing the spoilers by actuation alters the amount of bleed air and changes the forces and moments acting on the parafoil in a consistent manner such that it can be used for flight control.

The parafoil control system of the present invention comprises a parafoil and a plurality of upper-canopy slits to create spoilers wherein each slit is connected to an actuator by a control line to control the parafoil, improve glide slope control and improve landing accuracy; and a control module for wireless communication with the actuator.

The parafoil of the present invention is a planform comprising an upper canopy and lower canopy attached by a cell structure, thereby creating cell walls. Load bearing, or structural, cell walls are cell walls that have a payload control line at the intersection of the cell wall and the lower canopy. Non-load bearing, or non-structural, cell walls do not have a payload control line attached at the intersection of the lower canopy and the cell wall. The upper canopy of the parafoil comprises a plurality of spanwise slits perpendicular to the cells walls to create spoilers across a number of cells in the center section of the canopy. The length of the slits may span the entire length of the cell and the slits are located between 25% and 50% of chord length from the leading edge. Chord length is the distance from the leading edge of the parafoil to the trailing edge. In a preferred embodiment of the present invention, slits are located across the center 56% of the constructed span of the canopy. In a further embodiment of the present invention, an internal sealing flap is attached to the bottom of the upper canopy at the leading edge of the slit and extends across the slit to seal the slits when the spoilers are not actuated.

In a preferred embodiment of the present invention, the actuator comprises a means to control actuation and further comprises a main housing unit, a gear motor and means to control the motor, a spool or winch drum, electronics for control of the actuator, and a means to provide power to the actuator. The actuator of the present invention may further comprise a power source comprising a Lithium-ion polymer (LiPo) battery, an embedded microprocessor and magnetic rotary encoder for position feedback control for the spool, a transceiver for communication with the control module, and a sleep mode that eliminates the need to turn on each actuator prior to flight. It is understood that any type of actuator may be used and that the power source for the actuator may be provided by any source of stored energy such as a solar, kinetic or magnetic. The main housing unit of the preferred embodiment of the present is cylindrical and approximately four inches in height and one-inch in diameter. However, it is understood that actuator may be any aerodynamic shape or size and be made of any material that can withstand the payload delivery.

In the preferred embodiment of the present invention, each actuator is embedded within the canopy containing a slit. Each actuator is attached to a structural cell wall and the lower canopy below the slit and is located generally beneath the slit, preferably approximately the same chord length from the leading edge as the slit. A control line of a predetermined length is attached to the spool within each actuator and extends from the actuator through a small hole in the main housing. It is understood that the control line made be made of any suitable material such as nylon. A control line system comprises the control line, at least one device, such as a guide ring, that is attached to the leading edge of the slit or to the trailing edge of the internal sealing flap wherein the control line from the actuator is threaded through the device, and then the attachment of the control line to the parafoil at the intersection of the non-structural cell wall opposite the actuator. Altering the length of the control line with the actuator, wherein the control line is paid out and in, causes the slits to be opened, thereby creating aerodynamic spoilers that enable flight control. In a preferred embodiment of the present invention, the guide ring centrally located between the structural cell wall and the non-structural cell wall.

A control module provides a wireless interface between a controller and the control electronics of the on-canopy actuators. The controller may be positioned anywhere that can maintain a wireless interface between the controller and the on-canopy actuators. In a preferred embodiment of the present invention, each of the actuators may be controlled independently by the controller thereby allowing for symmetric and asymmetric actuation of the spoilers and individual control of the height of each spoiler.

Other aspects, features, and advantages will become apparent to those skilled in the art from the detailed description and accompanying drawings. It should be understood, however, that the detailed description and accompanying drawings, while indicating preferred embodiments of the present invention, are given by way of illustration and not limitation.

BRIEF DESCRIPTION OF THE DRAWINGS

FIG. 2 is a schematic of a preferred embodiment of the actuator and control line of present invention.

DETAILED DESCRIPTION OF THE INVENTION

Figure 1:
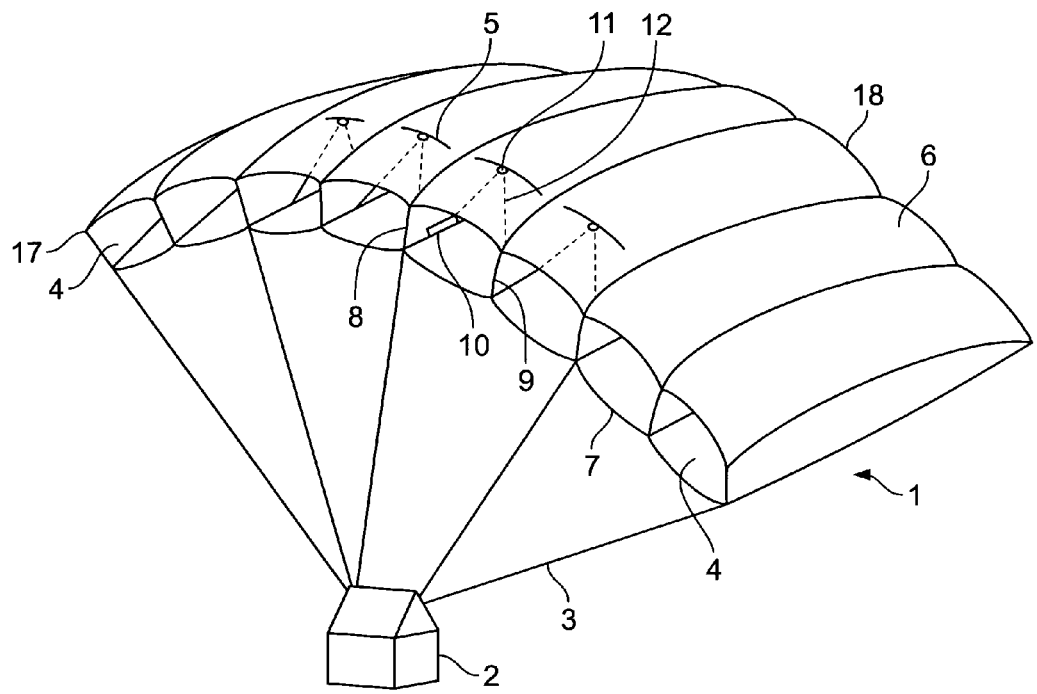
FIG. 1 a schematic of the present invention with a payload.

FIG. 1 is a schematic representation of the parafoil canopy 1 attached to payload control lines 3 which are further attached to a payload 2. The parafoil canopy 1 is planform and has a trailing edge 18 and a leading edge 17. The parafoil canopy 1 has a canopy upper surface 6 and a canopy lower surface 7 attached to one another by structural cell walls 8 and non-structural cell walls 9 forming cells 4 within the parafoil canopy 1. At least one cell 4 contains a slit 5 in the canopy upper surface 6. The structural cell walls 8 are attached to payload control lines 3. The actuator 10 is attached within the parafoil canopy 1 at the intersection of a structural cell wall 8 and the canopy lower surface 7. A guide ring 11 is attached to the canopy upper surface 6 at the leading edge of the slit 5. A control line 12 extends from the actuator 10 to the guide ring 11 and then is attached at the intersection of the canopy lower surface 7 and the non-structural cell wall 9 opposite the actuator 10. The actuator 10 and the control line 12 are attached to parafoil canopy 1 at the intersection of the canopy lower surface 7 and the non-structural cell wall 9 are located beneath the slit 5.

Figure 2:
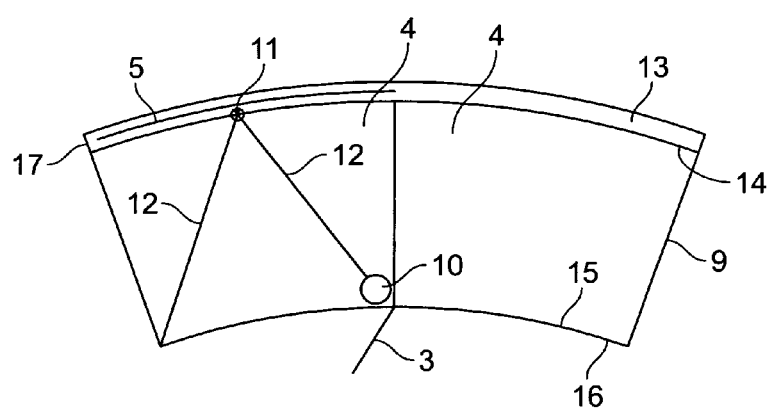
FIG. 2 is a schematic cross-sectional view of the leading edge of the parafoil canopy.

FIG. 2 is a schematic representation of a closer cross-sectional view of a cell 4 with an actuator 10 and a cell 4 without an actuator 10. Each cell 4 comprises a canopy upper surface 6 which further comprises an upper surface top 13 and an upper surface bottom 14, a canopy lower surface 7 which further comprises a lower surface top 15 and a lower surface bottom 16, a structural cell wall 8 and a non-structural cell wall 9. A payload control line 3 is attached to the lower surface bottom 16. The cell 4 comprising the actuator 10 further comprises a slit 5 that at least partially spans the canopy upper surface 6 of cell 4. A guide ring 11 is attached to upper surface bottom 14 edge of slit 11 that is closest to the leading edge 17. The actuator 10 is attached at the intersection of the lower surface top 15 and the structural cell wall 8 directly below the slit 5 and. A control line system comprises a control line 12 that extends from the actuator 10 to the guide ring 11 and is then attached to the parafoil canopy 1 at the intersection of the canopy lower surface 7 and the non-structural cell wall 9 opposite the actuator 10 located beneath the slit 5.

Figure 3:
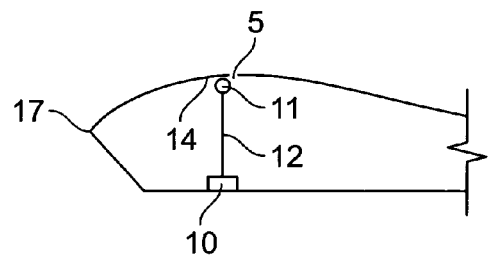
FIG. 3 is a schematic of a side view of a preferred embodiment of the present invention.

FIG. 3 is a schematic side view of the leading edge 17 of the parafoil canopy 1 prior to actuation wherein the guide ring 11 is attached to the upper surface bottom 14 at the edge of the slit 5 that is closest to the leading edge 17. The actuator 10 is located beneath slit 5 and the control line 12 travels from the actuator 10 to the guide ring 11. The figure does not show the complete path of the control line 12.

Figure 4:
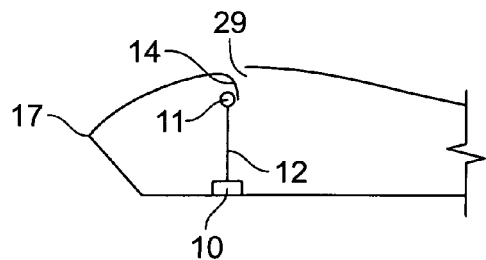
FIG. 4 is a schematic of a side view of a preferred embodiment of the present invention wherein actuation has caused the slits to open.

FIG. 4 is a schematic side view of the leading edge 17 of the parafoil canopy 1 wherein the guide ring 11 had been moved by the action of the actuator 10 on control line 12, thereby enlarging slit 5 to create spoiler 29. The figure does not show the complete path of the control line 12.

Figure 5:
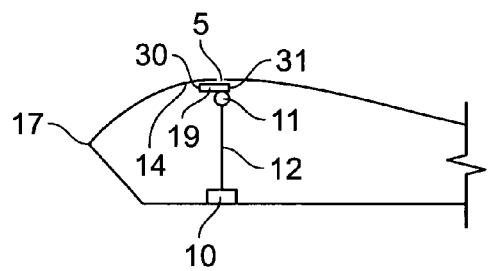
FIG. 5 is a schematic of a side view of a preferred embodiment of the present invention wherein an internal sealing flap has been attached to the canopy upper surface.

FIG. 5 is a schematic side view of the leading edge 17 of the parafoil canopy 1 prior to actuation wherein an internal sealing flap 19 has a leading edge side 30 and a trailing edge side 31. The leading edge side 30 of the internal sealing flap 19 is attached to the upper surface bottom 14 at the edge of slit 5 that is closest to leading edge 17. The internal sealing flap 19 extends across slit 5 and the trailing edge side 31 is not attached to the upper surface bottom 14. Guide ring 11 is attached to the internal sealing flap 19 at the trailing edge side 31. The actuator 10 is located beneath slit 5 and the control line 12 travels from the actuator 10 to the guide ring 11. The figure does not show the complete path of the control line 12.

Figure 6:
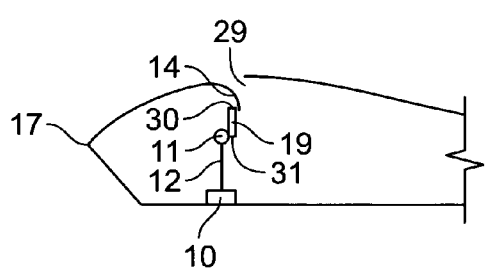
FIG. 6 is a schematic of a side view of a preferred embodiment of the present invention wherein an internal sealing flap has been attached to the canopy upper surface and actuation has caused the slits to open.

FIG. 6 is a schematic side view of the leading edge 17 of the parafoil canopy 1wherein the guide ring 11 had been moved by the action of the actuator 10 on control line 12, thereby enlarging slit 5 to create spoiler 29. The figure does not show the complete path of the control line 12.

Figure 7:
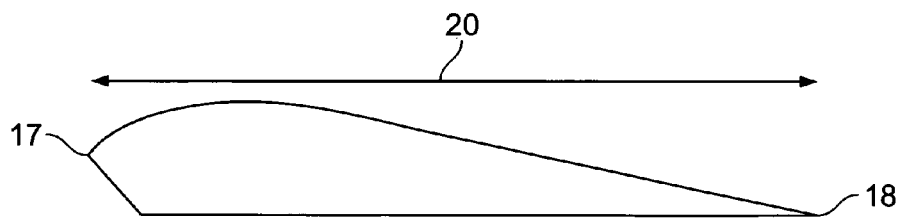
FIG. 7 is schematic of a side view of the parafoil canopy.

FIG. 7 is a schematic side view of parafoil canopy 1 wherein the chord line 20 is the distance from the leading edge 17 to the trailing edge 18.

Figure 8:
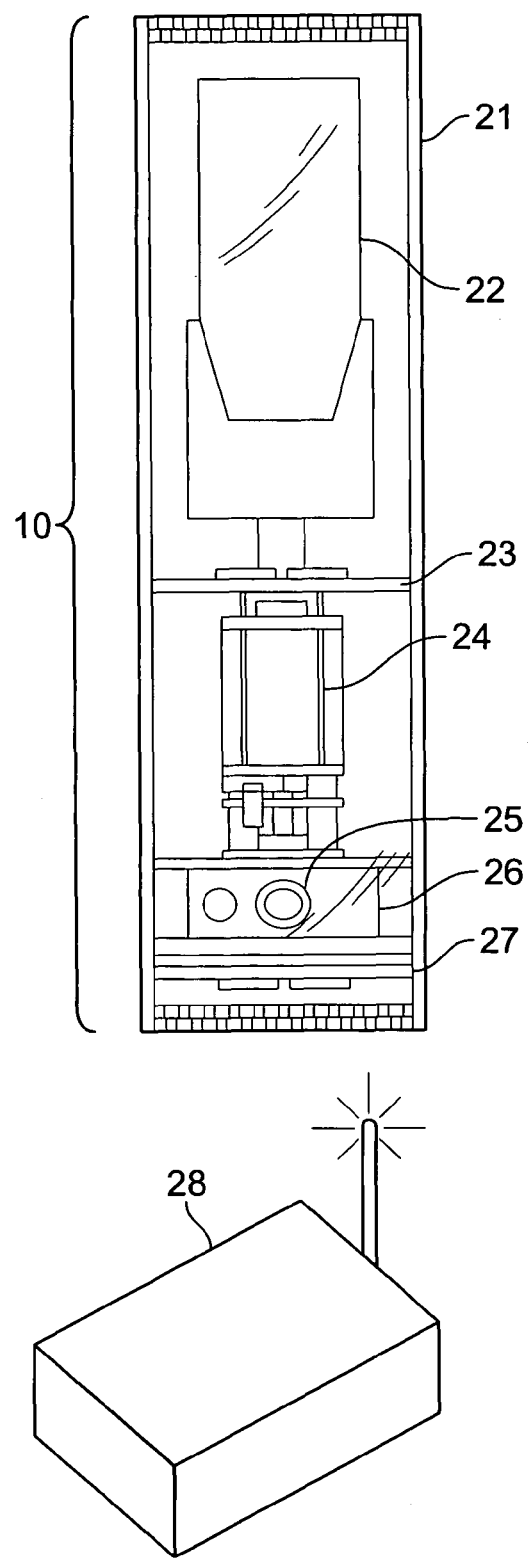
FIG. 8 is a schematic of the preferred embodiment of the actuator and control module.

FIG. 8 is a schematic cross-sectional view of the preferred embodiment of the actuator 10 of the present invention and the control module 28. The actuator 10 comprises a main housing unit 21 comprising an opening 25. The means for controlling the actuator 10 of the present invention includes a battery 22 connected to power electronics 23 which in turn activate the gear motor 24. Once activated, the gear motor 24 moves spool 26 causing actuation. The actuator 10 of the present invention comprises control electronics 26 that are in wireless communication with control module 28.

We claim:

1. A system to control the flight path of a parafoil carrying a payload comprising:
   a parafoil canopy comprising;
      a canopy upper surface comprising a top and a bottom,
      a canopy lower surface comprising a top and a bottom,
         wherein the canopy upper surface and canopy lower surface are attached by a cell structure wherein the cell structure comprises a plurality of structural cell walls and a plurality of non-structural cell walls thereby creating a plurality of cells within the parafoil canopy between the canopy upper surface and the canopy lower surface,
      a leading edge and a trailing edge,
      a chord line, a plurality of slits, wherein each of the slits comprises a leading edge side and a trailing edge side and is located in the canopy upper surface parallel to the leading edge at a distance of approximately 25%-50% of the chord line from the leading edge, a plurality of actuators each comprising a control means wherein the control means controls actuation of the actuator, and each actuator is located within a cell comprising a slit and is attached to the parafoil canopy at an intersection of the top of the canopy lower surface and a structural cell wall such that the actuator is located approximately beneath the slit, a plurality of control line systems comprising;
- a control line having a predetermined length, wherein a control line is attached to each of the plurality of actuators and the predetermined length of the control line may be adjusted by actuation of the actuator, and
- at least one device for receiving the control line located on the bottom of the canopy upper surface at the leading edge side of the slit, wherein the control line extends from the actuator, through the at least one device for receiving the control line and is attached to the parafoil canopy at an intersection of the top of the canopy lower surface and a cell wall opposite the actuator; and a control module wherein said control module comprises a means for wireless communication with the control means of each of the plurality of actuators.

2. The system of claim 1 wherein the at least one device for receiving the control line is a guide ring.

3. The system of claim 2 wherein the slits are located across the center 56% of the cells of the parafoil canopy.

4. The system of claim 3 further comprising an internal sealing flap wherein the internal sealing flap is attached to the bottom of the canopy upper surface at the leading edge of the slit and extends to at least the trailing edge of the slit and the at least one device for receiving the control line is attached to the internal sealing flap.

5. The system of claim 2 further comprising an internal sealing flap wherein the internal sealing flap is attached to the bottom of the canopy upper surface at the leading edge of the slit and extends to at least the trailing edge of the slit and the at least one device for receiving the control line is attached to the internal sealing flap.

6. The system of claim 1 wherein the slits are located across approximately the center 56% of the cells of the parafoil canopy.

7. The system of claim 6 further comprising an internal sealing flap wherein the internal sealing flap is attached to the bottom of the canopy upper surface at the leading edge of the slit and extends to at least the trailing edge of the slit and the at least one device for receiving the control line is attached to the internal sealing flap.

8. The system of claim 1 further comprising an internal sealing flap wherein the internal sealing flap is attached to the bottom of the canopy upper surface at the leading edge of the slit and extends to at least the trailing edge of the slit and the at least one device for receiving the control line is attached to the internal sealing flap.

9. A method to control the flight path of a parafoil carrying a payload comprising:
deploying a parafoil canopy comprising:
a canopy upper surface comprising a top and a bottom,
a canopy lower surface comprising a top and a bottom,
wherein the canopy upper surface and canopy lower surface are attached by a cell structure wherein the cell structure comprises a plurality of structural cell walls and a plurality of non-structural cell walls thereby creating a plurality of cells within the parafoil canopy between the canopy upper surface and the canopy lower surface, a leading edge and a trailing edge, a chord line, a plurality of slits, wherein each of the slits comprises a leading edge side and a trailing edge side and is located in the canopy upper surface parallel to the leading edge at a distance of approximately 25%-50% of the chord line from the leading edge, a plurality of actuators each comprising a control means wherein the control means controls actuation of the actuator, and each actuator is located within a cell comprising a slit and is attached to the parafoil canopy at an intersection of the top of the canopy lower surface and a structural cell wall such that the actuator is located approximately beneath the slit, a plurality of control line systems comprising;
- a control line having a predetermined length, wherein a control line is attached to each of the plurality of actuators and the predetermined length of the control line may be adjusted by actuation of the actuator, and
- at least one device for receiving the control line located on the bottom of the canopy upper surface at the leading edge side of the slit, wherein the control line extends from the actuator, through the at least one device for receiving the control line and is attached to the parafoil canopy at an intersection of the top of the canopy lower surface and a cell wall opposite the actuator; and controlling the actuators of the parafoil canopy using a control module wherein said control module comprises a means for wireless communication with the control means of each of the plurality of actuators.

10. The method of claim 9 wherein the device for receiving the control line is a guide ring.

11. The method of claim 10 wherein the slits are located across the center 56% of the cells of the canopy.

12. The method of claim 11 further comprising an internal sealing flap wherein the internal sealing flap is attached to the bottom of the canopy upper surface at the leading edge of the slit and extends to at least the trailing edge of the slit and the at least one device for receiving the control line is attached to the internal sealing flap.

13. The method of claim 10 further comprising an internal sealing flap wherein the internal sealing flap is attached to the bottom of the canopy upper surface at the leading edge of the slit and extends to at least the trailing edge of the slit and the at least one device for receiving the control line is attached to the internal sealing flap.

14. The method of claim 9 wherein the slits are located across approximately the center 56% of the cells of the parafoil canopy.

15. The method of claim 9 further comprising an internal sealing flap wherein the internal sealing flap is attached to the bottom of the upper surface canopy at the leading edge of the slit and extends to at least the trailing edge of the slit and the at least one device for receiving the control line is attached to the internal sealing flap.

* * * * *